Patented Jan. 13, 1948

2,434,246

UNITED STATES PATENT OFFICE 2,434,246

SYNTHESIS OF ALDEHYDES AND LACTONES

Roland Kapp, Newark, Frank D. Pickel, Bogota, and Louis T. Rosenberg, Ridgefield Park, N. J., assignors to Nopco Chemical Company, Harrison, N. J., a corporation of New Jersey No Drawing. Application December 13, 1941, Serial No. 422,868

1 Claim. (Cl. 260—344)

This invention relates in general to the synthesis of aldehydes and lactones, and more particularly to the preparation of $\alpha,\alpha$-dimethyl-$\beta$-hydroxypropionaldehyde and $\alpha$-hydroxy-$\beta,\beta$-dimethyl-$\gamma$-butyrolactone.

With the discovery of the physiological activity of pantothenic acid and the subsequent determination of the structure thereof, $\alpha$-hydroxy-$\beta,\beta$-dimethyl-$\gamma$-butyrolactone has become a chemical of major importance. In the synthesis of pantothenic acid, $\alpha$-hydroxy-$\beta,\beta$-dimethyl-$\gamma$-butyrolactone or the corresponding acid is condensed with $\beta$-alanine or a salt or ester thereof. $\alpha,\alpha$-dimethyl-$\beta$-hydroxypropionaldehyde is one of the principal compounds used in the synthesis of $\alpha$-hydroxy-$\beta,\beta$-dimethyl-$\gamma$-butyrolactone and the corresponding acid. $\alpha,\alpha$-dimethyl-$\beta$-hydroxypropionaldehyde, and $\alpha$-hydroxy-$\beta,\beta$-dimethyl-$\gamma$-butyrolactone and the corresponding acid have been known for many years as have processes for preparing the same. However, the heretofore known processes for preparing these compounds have been rather inefficient and costly because of the cumbersomeness of and length of time required to carry out certain steps in the processes. The cumbersomeness and lengthiness of these procedures have also tended to lower the yield of the final products.

$\alpha,\alpha$-dimethyl-$\beta$-hydroxypropionaldehyde is usually prepared by condensing isobutyraldehyde with formaldehyde. Upon completion of the reaction, the product is extracted from the reaction mass with ethyl ether. Although the extraction with ether in this step is fairly efficient, room for vast improvement remains. Furthermore, ethyl ether is a highly dangerous material to handle due to its exceedingly high inflammability and explosive character. In the producton of $\alpha$-hydroxy-$\beta,\beta$-dimethyl-$\gamma$-butyrolactone, $\alpha,\alpha$-dimethyl-$\beta$-hydroxypropionaldehyde is converted into its bisulfite compound which in turn is converted into the corresponding cyanohydrin. The cyanohydrin is then treated with hydrochloric acid which converts the cyanohydrin to $\alpha,\gamma$-dihydroxy-$\beta,\beta$-dimethyl-n-butyric acid. Water is added and the solution heated to convert the acid to the lactone. The lactone is then extracted from the solution with ethyl ether. In order to obtain an efficient recovery of the lactone it is necessary to extract the aqueous solution with ether continuously for a period of from 16 to 18 hours. Notwithstanding this prolonged period of extraction the yields are far from being commercially satisfactory. Thus this procedure is inefficient as regards the yields obtained in addition to being tedious, cumbersome and time-consuming. Furthermore, there are the additional hazards involved in using such a solvent as ethyl ether, i. e., its extremely high inflammability and explosive character.

It is the object of this invention to obviate the foregoing disadvantages in the synthesis of $\alpha$-hydroxy-$\beta,\beta$-dimethyl-$\gamma$-butyrolactone and its corresponding acid.

A specific object of this invention is to provide an improved method of extracting $\alpha,\alpha$-dimethyl-$\beta$-hydroxypropionaldehyde and $\alpha$-hydroxy-$\beta,\beta$-dimethyl-$\gamma$-butyrolactone from the reaction mass in which they are produced.

A further object of this invention is to provide means for materially reducing the time required to extract $\alpha$-hydroxy-$\beta,\beta$-dimethyl-$\gamma$-butyrolactone from the reaction mass in which it is produced while at the same time increasing the yield of lactone obtained and decreasing the fire hazard involved in the process.

Other objects of the invention will in part be obvious and will in part appear hereinafter.

It has now been discovered that the foregoing and other objects of the invention may be readily accomplished by employing halogenated hydrocarbon solvents in place of ethyl ether in the extraction of $\alpha,\alpha$-dimethyl-$\beta$-hydroxypropionaldehyde and $\alpha$-hydroxy-$\beta,\beta$-dimethyl-$\gamma$-butyrolactone from the reaction mass in which they are produced. Not only may the extraction thus be very efficiently accomplished in a minimum of time, but also the hazards involved in the process are very greatly reduced since the halogenated hydrocarbon solvents employed are in most instances much less inflammable than ethyl ether. The advantage of using halogenated hydrocarbons is especially great in the extraction of the $\alpha$-hydroxy-$\beta,\beta$-dimethyl-$\gamma$-butyrolactone since we have found that substantially all of the lactone may be extracted from the reaction mass in less than about one hour when employing the preferred halogenated hydrocarbon solvents, and in only slightly longer than one hour when the less preferred halogenated hydrocarbon solvents are used; whereas when ethyl ether is employed, from about 16 hours to about 18 hours are usually required to extract substantially all of the lactone which can be obtained by using ethyl ether. Moreover, the amount of lactone which is obtained when using ether is appreciably less than that which may be obtained by using a halogenated hydrocarbon solvent.

It is preferred that a halogenated hydrocarbon solvent having a relatively low boiling point, i. e., below 100° C., be employed due to the fact that the removal of the solvent from the aldehyde and from the lactone will thus be simplified since the separation may then be easily accomplished by fractional distillation. Of course solvents which have a boiling point higher than 100° C. may be employed, if desired, provided their boiling points are below those of the aldehyde and the lactone so that the solvents may be separated therefrom by distillation. Since the aldehyde has a tendency to polymerize when heated too vigorously, it is preferred that the solvents used to extract the aldehyde be ones which do not have boiling points in excess of 100° C. since in removing the solvent, even if removing it under reduced pressure, there may be some polymerization of the aldehyde if the solvent is one which boils at a temperature very much in excess of 100° C. Thus among the solvents which may be employed, there may be mentioned methylene chloride, ethylene dichloride, chloroform, propylene dichloride, trichloroethylene, and similar halogenated hydrocarbon solvents, the first three solvents named being highly preferred.

In carrying out the process of the invention, the synthesis of the $\alpha,\alpha$-dimethyl-$\beta$-hydroxypropionaldehyde and of the $\alpha$-hydroxy-$\beta,\beta$-dimethyl-$\gamma$-butyrolactone may be carried out essentially as set forth by Stiller et al. in the Journal of the American Chemical Society, 62, pages 1785-1790 (1940), or by any other suitable method with the exception that instead of using ethyl ether to extract the $\alpha,\alpha$-dimethyl-$\beta$-hydroxypropionaldehyde and the $\alpha$-hydroxy-$\beta,\beta$-dimethyl-$\gamma$-butyrolactone from the reaction masses in which they are produced, a halogenated hydrocarbon solvent, preferably methylene chloride, ethylene dichloride or chloroform, is employed. The actual extraction may be carried out in any suitable manner, thus either a continuous or batch process may be employed. In extracting the lactone with ethyl ether, it is necessary to extract the reaction medium continuously for 16 to 18 hours, whereas when a halogenated hydrocarbon solvent such as those mentioned above is employed, a considerably higher yield of the lactone is obtained with only four or five successive extractions of the reaction mass, which extractions may conveniently be carried out in less than about one hour. Furthermore, as has been previously mentioned, the hazards which are involved in the use of ethyl ether are greatly reduced in most cases when the preferred chlorinated hydrocarbons, particularly methylene chloride and ethylene dichloride, are employed in place of the ethyl ether.

In producing $\alpha$-hydroxy-$\beta,\beta$-dimethyl-$\gamma$-butyrolactone by converting the corresponding cyanohydrin to the lactone, a racemic mixture of the lactone is obtained. It is known that pantothenic acid produced by reacting $\beta$-alanine or salts or esters thereof with d-$\alpha$-hydroxy-$\beta,\beta$-dimethyl-$\gamma$-butyrolactone has little or no physiological activity; and that in order to obtain pantothenic acid having physiological activity, the levorotatory lactone must be employed in the synthesis; consequently it is highly desirable to resolve the racemic mixture. This may readily be done by converting the racemic mixture to the quinine salts of the acids and then separating the salt of the l-acid from that of d-acid by fractional crystallization. The quinine salt of the d-acid is converted to the sodium salt thereof and the liberated quinine removed from the solution. The sodium salt of the d-acid is hydrolyzed with acid and the l-lactone recovered by extracting it from the aqueous reaction medium. The quinine salt of the l-acid is likewise converted to the sodium salt thereof, the liberated quinine removed, and a neutral solution of the sodium salt is heated to convert the l-acid to the d,l-acid. The sodium salt of the d,l-acid obtained is then hydrolyzed with acid and the l-lactone isolated and recovered as before. Formerly the extraction of the l-lactone in both instances, i. e., the extraction of the l-lactone originally present and the extraction of that obtained by converting the d-lactone to the d,l-lactone, has been carried out by extracting the lactone from the reaction mass with ethyl ether. However, here, just as in the extraction of the original racemic mixture of the lactone, we have found that greatly superior results may be obtained by employing halogenated hydrocarbon solvents in place of ethyl ether to extract the l-lactone. In the specification and claims when we speak of employing a halogenated hydrocarbon solvent "to extract the lactone from the reaction mass in which it is produced," we refer not only to the extraction of the original racemic mixture of the lactone, but also to any other step in the preparation of the lactone wherein the lactone, either the dextrotatory or the levorotatory form, is to be extracted from a reaction medium and that extraction may be accomplished by the use of ethyl ether, e. g., as was just mentioned above in the separation of the d-lactone from the l-lactone and the subsequent recovery of the l-lactone, and the conversion of the d-lactone to the d,l-lactone and the recovery of the l-lactone produced.

The recovery of the aldehyde and of the lactone from the halogenated hydrocarbon solutions thereof may readily be accomplished by removing the solvent by means of distillation in any suitable manner, preferably under reduced pressure.

Although our invention has been described, particularly with reference to the production of $\alpha,\alpha$-dimethyl-$\beta$-hydroxy-propionaldehyde and $\alpha$-hydroxy-$\beta,\beta$-dimethyl-$\gamma$-butyrolactone, it is to be understood that it is by no means limited to the production of these two compounds, since it is well known that there are compounds other than pantothenic acid which have to a certain extent the physiological activity of pantothenic acid. In the production of such compounds, some of the intermediate compounds, i. e., aldehydes and lactones, in the synthesis may be prepared similarly to $\alpha,\alpha$-dimethyl-$\beta$-hydroxypropionaldehyde and $\alpha$-hydroxy-$\beta,\beta$-dimethyl-$\gamma$-butyrolactone. When such is the case, the aldehyde and the lactone instead of being extracted from the respective reaction media with ethyl ether may be extracted therefrom with much greater efficiency and safety by means of a halogenated hydrocarbon solvent in a manner as has been described hereinabove.

For a fuller understanding of the nature and objects of the invention, reference should be had to the following examples which are given merely to further illustrate the invention and are not to be construed in a limiting sense, all parts given being by weight.

*Example I*

15 parts of isobutyraldehyde were condensed with 17 parts of formalin (40% formaldehyde) in the usual manner in the presence of 13.7 parts of potassium carbonate. When the reaction was complete, 50 parts of ethylene dichloride were added and the mixture stirred for about 20 minutes. The mixture was then allowed to separate into layers and the ethylene dichloride layer was removed and dried over sodium sulfate. The ethylene dichloride was then removed by means of vacuum distillation. The recovery of the α,α-dimethyl-β-hydroxypropionaldehyde was substantially equivalent to the theoretical amount.

*Example II*

20 parts of α,α-dimethyl-β-hydroxypropionaldehyde were reacted with a solution of 21.2 parts of sodium bisulfite. The bisulfite compound obtained was converted to the corresponding cyanohydrin by reacting it with 15.8 parts of potassium cyanide. The cyanohydrin was then converted to α-hydroxy-β,β-dimethyl-γ-butyrolactone by acid hydrolysis. The solution of the lactone was neutralized to a pH of about 7.2, and the lactone then extracted therefrom with ethylene dichloride merely by mixing the solvent with the solution and drawing off the ethylene dichloride layer which separates. The solution was extracted successively with 35, 25, and four 15-part portions of ethylene dichloride. The d,l-lactone was then recovered by removing the solvent under reduced pressure. A yield of lactone from 15% to 20% greater than that obtainable by continuously extracting the solution of the lactone with ethyl ether was obtained.

*Example III* d,l - α - hydroxy-β,β-dimethyl-γ-butyrolactone was prepared essentially as in Example II, the principal difference being that methylene chloride was employed in place of ethylene dichloride to extract the lactone from the reaction mass. The results obtained were even better than those in Example II.

*Example IV*

A quantity of d,l-α-hydroxy-β,β-dimethyl-γ-butyrolactone was resolved in the usual manner to obtain the l-lactone. The l-lactone was then recovered from the reaction mass by extracting with five portions of ethylene dichloride. The solvent was then removed under vacuum. Substantially complete recovery of the lactone was obtained.

*Example V*

Similar extractions of l-α-hydroxy-β,β-dimethyl-γ-butyrolactone as were made in Example IV were made with methylene chloride and with chloroform. In each case the results obtained were slightly better than when using ethylene dichloride.

From the above it can readily be seen that we have provided a much more efficient and far safer means of recovering α,α-dimethyl-β-hydroxypropionaldehyde and α-hydroxy-β,β-dimethyl-γ-butyrolactone from the reaction masses in which they are produced than has hitherto been available.

Since certain changes may be made in carrying out the above process without departing from the scope of the invention, it is intended that all matter contained in the above description shall be interpreted as illustrative and not in a limiting sense.

Having described our invention, what we claim as new and desire to secure by Letters Patent is:

In the process of synthesizing α-hydroxy-β,β-dimethyl-γ-butyrolactone, the step which comprises extracting the same from the aqueous reaction mass in which it is produced by dissolving said lactone in ethylene dichloride.

ROLAND KAPP.
FRANK D. PICKEL.
LOUIS T. ROSENBERG.

REFERENCES CITED

The following references are of record in the file of this patent:

UNITED STATES PATENTS

| Number | Name | Date |
|---|---|---|
| 1,830,618 | Pasternack | Nov. 3, 1931 |
| 2,271,872 | Mitchell | Mar. 25, 1940 |

OTHER REFERENCES

Kamm, Qualitative Organic Analysis, 1932, page 13.

Journal American Chemical Society, Nov., 1938, pages 2719–2723.

Journal American Chemical Society, July, 1940, pages 1776–1790.

Helvetica Chemica Acta, vol. 23, pages 1276–1284.

Cumming et al., Systematic Organic Chemistry, 1931, pages 8 to 16.

McArdle, Solvents in Synthetic Organic Chemistry, 1925, pages 129–136, 72, 73.

Monatscheft (Glaser), vol. 25, pages 46–54.

Monatscheft, vol. 39, pages 295–296.